US008573918B2

(12) United States Patent
Lawson et al.

(10) Patent No.: US 8,573,918 B2
(45) Date of Patent: Nov. 5, 2013

(54) DUAL MODE END EFFECTOR

(75) Inventors: Lawrence J. Lawson, Troy, MI (US); David Henry Larson, Swartz Creek, MI (US)

(73) Assignee: Android Industries LLC, Auburn Hills, MI (US)

( * ) Notice: Subject to any disclaimer, the term of this patent is extended or adjusted under 35 U.S.C. 154(b) by 292 days.

(21) Appl. No.: 12/860,442

(22) Filed: Aug. 20, 2010

(65) Prior Publication Data

US 2011/0048650 A1 Mar. 3, 2011

Related U.S. Application Data

(60) Provisional application No. 61/237,093, filed on Aug. 26, 2009.

(51) Int. Cl.
*B66C 1/00* (2006.01)

(52) U.S. Cl.
USPC ............................................. 414/741; 157/16

(58) Field of Classification Search
USPC .............. 157/16, 21, 1.26, 1.28, 11, 20, 1.11, 157/1.17, 14; 414/429, 426, 428, 431, 432, 414/433, 757, 774, 777, 779, 23, 799, 567, 414/620, 621, 628, 626, 729, 732, 733, 736, 414/738, 741, 746.3, 763, 783, 427, 785, 414/910, 911; 269/269, 268, 285, 271, 265, 269/256, 152, 86, 77, 71, 2, 9
See application file for complete search history.

(56) References Cited

U.S. PATENT DOCUMENTS

| | | | | | |
|---|---|---|---|---|---|
| 1,807,360 | A | * | 5/1931 | Wehr ............................ | 294/106 |
| 2,596,477 | A | * | 5/1952 | Frischmann et al. ......... | 414/620 |
| 2,674,387 | A | * | 4/1954 | Ehmann ......................... | 414/621 |
| 2,775,359 | A | * | 12/1956 | Carpenter ...................... | 414/621 |
| 3,830,388 | A | * | 8/1974 | Mott .............................. | 414/429 |
| 3,854,614 | A | * | 12/1974 | Albrecht ........................ | 414/432 |
| 3,970,342 | A | * | 7/1976 | Cotton .......................... | 294/86.4 |
| 3,971,585 | A | * | 7/1976 | LaBudde ....................... | 294/207 |
| 4,336,926 | A | * | 6/1982 | Inagaki et al. ................. | 269/34 |
| 4,462,776 | A | * | 7/1984 | Fujimoto et al. .............. | 425/31 |

(Continued)

*Primary Examiner* — Saul Rodriguez
*Assistant Examiner* — Glenn Myers
(74) *Attorney, Agent, or Firm* — Honigman Miller Schwartz and Cohn LLP

(57) ABSTRACT

A dual mode end effector is disclosed. The dual mode end effector includes a bridge member having a first end and a second end, wherein the bridge member includes a first substantially axial flange extending from the first and, wherein the bridge member includes a second substantially axial flange extending from the second end; a tire/wheel gripping assembly connected to the bridge member, wherein the tire/wheel gripping assembly includes a pair of substantially axial members, a substantially radial support member, and a pair of radially-projecting engaging assemblies, wherein the pair of substantially axial members are movably-supported upon the substantially radial support member, wherein a first end of the substantially radial support member is connected to the first substantially axial flange of the bridge member, wherein the a second end of the substantially radial support member is connected to the second substantially axial flange of the bridge member, wherein a first radially-projecting engaging assembly of the pair of radially-projecting engaging assemblies is connected to an inner radial surface of a first substantially axial member of the pair of substantially axial members, wherein a second radially-projecting engaging assembly of the pair of radially-projecting engaging assemblies is connected to an inner radial surface of a second substantially axial member of the pair of substantially axial members.

2 Claims, 10 Drawing Sheets

(56) References Cited

U.S. PATENT DOCUMENTS

| | | | | |
|---|---|---|---|---|
| 4,546,681 | A | * | 10/1985 | Owsen ............................ 82/162 |
| 4,629,389 | A | * | 12/1986 | Kontz ............................ 414/433 |
| 4,732,528 | A | * | 3/1988 | Good ............................ 414/802 |
| 5,226,465 | A | * | 7/1993 | Schon et al. ................. 157/1.28 |
| 5,566,466 | A | * | 10/1996 | Hearne ............................ 34/58 |
| 5,980,083 | A | * | 11/1999 | Patte et al. ...................... 700/95 |
| 6,527,032 | B2 | * | 3/2003 | Corghi ........................ 157/1.28 |
| 7,097,406 | B1 | * | 8/2006 | Gang ............................ 414/429 |
| 7,509,988 | B1 | * | 3/2009 | Nemish ........................... 157/17 |
| 7,551,979 | B2 | * | 6/2009 | Saraliev ........................ 700/245 |
| 2005/0254923 | A1 | * | 11/2005 | Gorski et al. ................ 414/426 |
| 2007/0000616 | A1 | * | 1/2007 | Rogalla et al. ................. 157/1.1 |
| 2009/0035107 | A1 | * | 2/2009 | Duran et al. .................. 414/426 |

\* cited by examiner

DUAL MODE END EFFECTOR

RELATED APPLICATION

This disclosure claims priority to U.S. Provisional Patent Application Ser. No. 61/237,093 filed on Aug. 26, 2009.

FIELD OF THE INVENTION

The disclosure relates to an apparatus that is utilized during the process for manufacturing a tire-wheel assembly and to an apparatus having a manipulatable orientation that may be selectively modified to permit engagement of the apparatus with one of a tire or a wheel.

DESCRIPTION OF THE RELATED ART

It is known in the art that a tire-wheel assembly is assembled in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of an apparatus that is utilized during the process for manufacturing a tire-wheel assembly in accordance with an embodiment of the invention. Based on the foregoing, it is to be generally understood that the nomenclature used herein is simply for convenience and the terms used to describe the invention should be given the broadest meaning by one of ordinary skill in the art.

In an embodiment, an apparatus is shown generally at 10 in FIGS. 1-4D. The apparatus 10 may or may not interface with a "single-cell" workstation. In the forgoing disclosure, it will be appreciated that term "single-cell" indicates that the workstation provides a tire-wheel assembly (not shown) without requiring a plurality of successive, discrete workstations that may otherwise be arranged in a conventional assembly line. Rather, the single cell workstation provides one workstation having a plurality of subs-stations (not shown), each performing a specific task in the processing of a tire-wheel assembly. As such, the single-cell workstation significantly reduces the cost, investment and maintenance associated with a conventional tire-wheel assembly line located on a relatively large real estate footprint. Thus, capital investment and human oversight is significantly reduced when a single cell workstation is employed in the processing of tire-wheel assemblies.

Figure 2A:
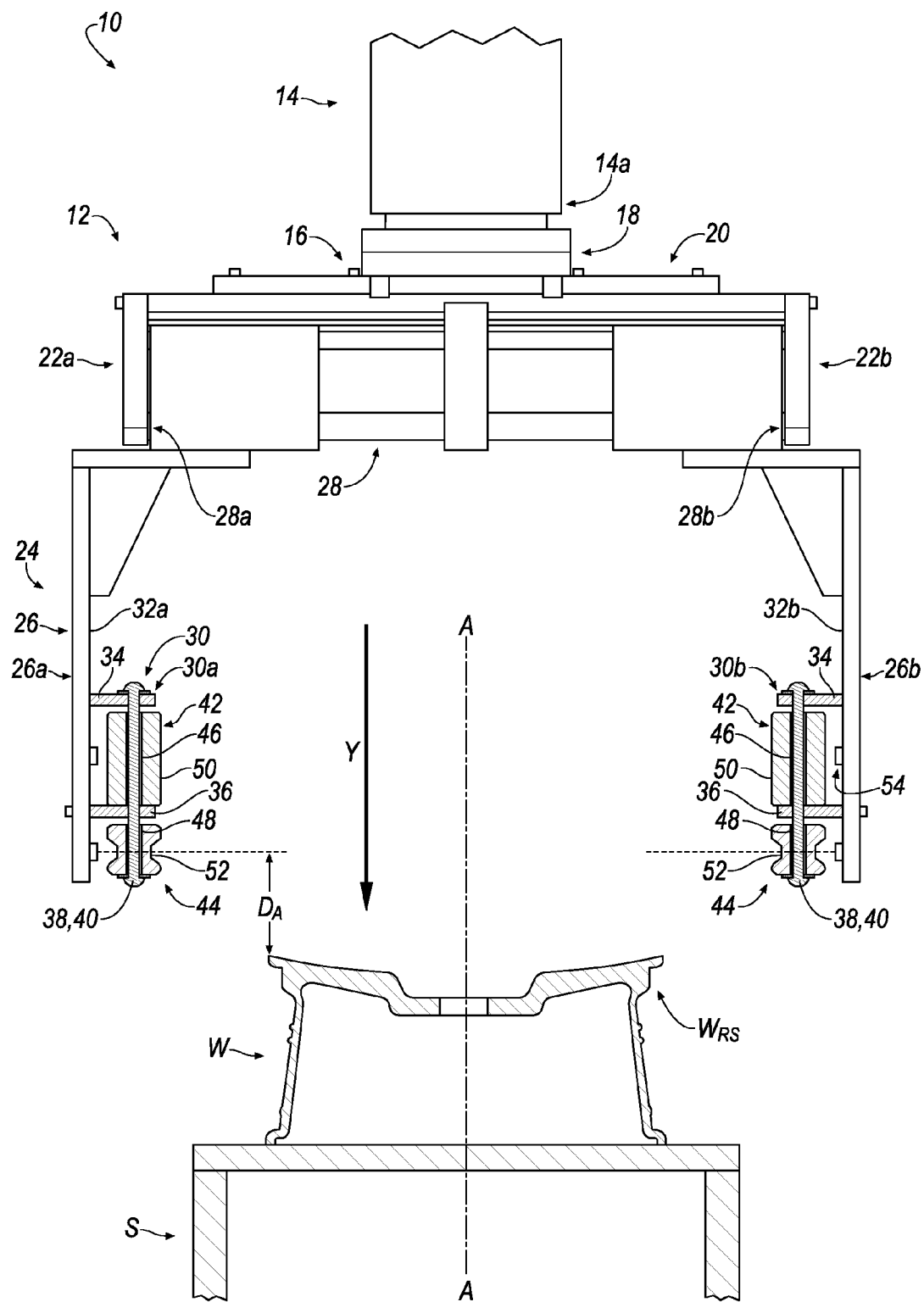
FIG. 2A is a partial cross-sectional view according to line 2-2 of FIG. 1 in accordance with an exemplary embodiment of the invention.
Figure 2B:
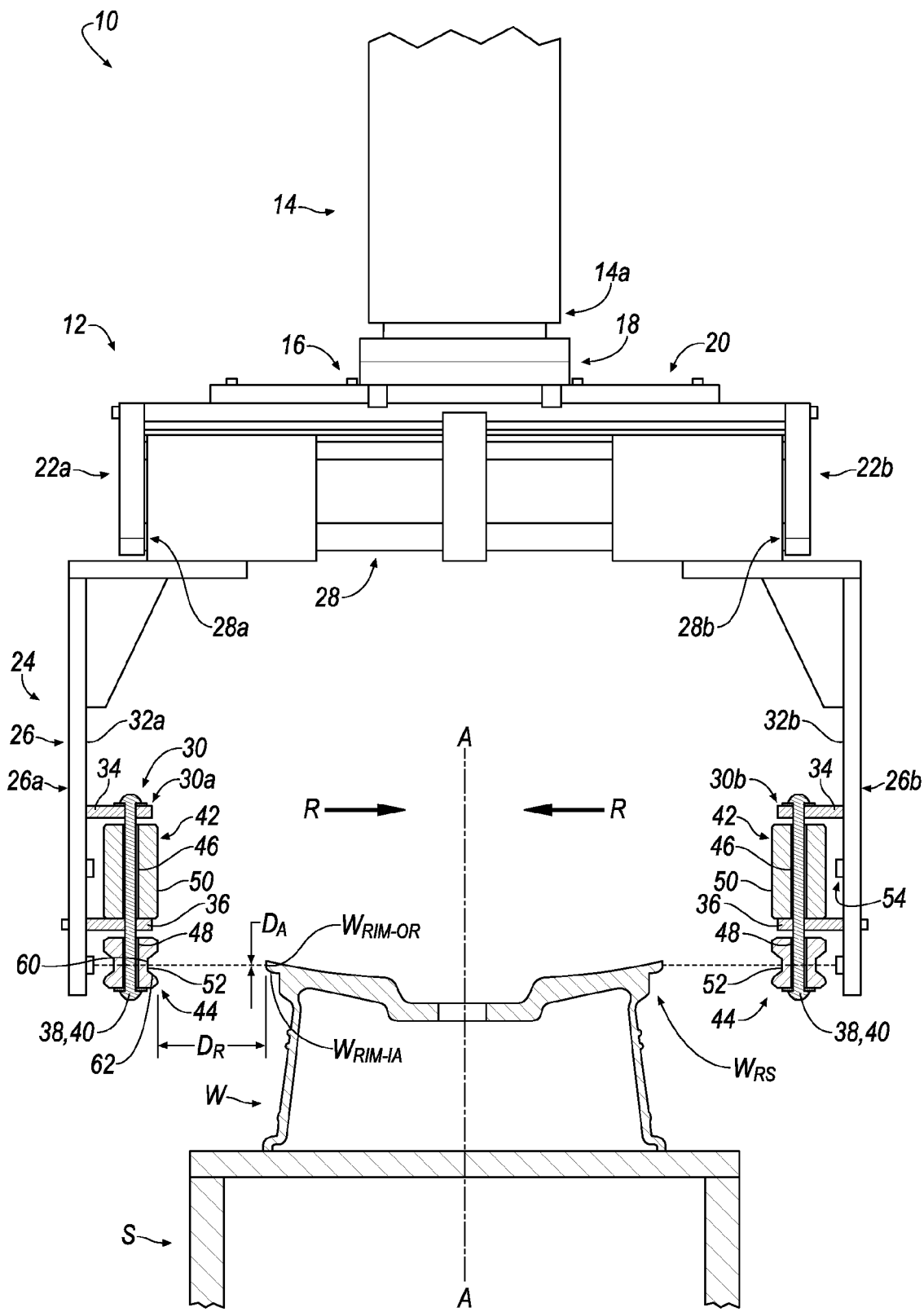
FIG. 2B is another partial cross-sectional view according to FIG. 2A in accordance with an exemplary embodiment of the invention.
Figure 2C:
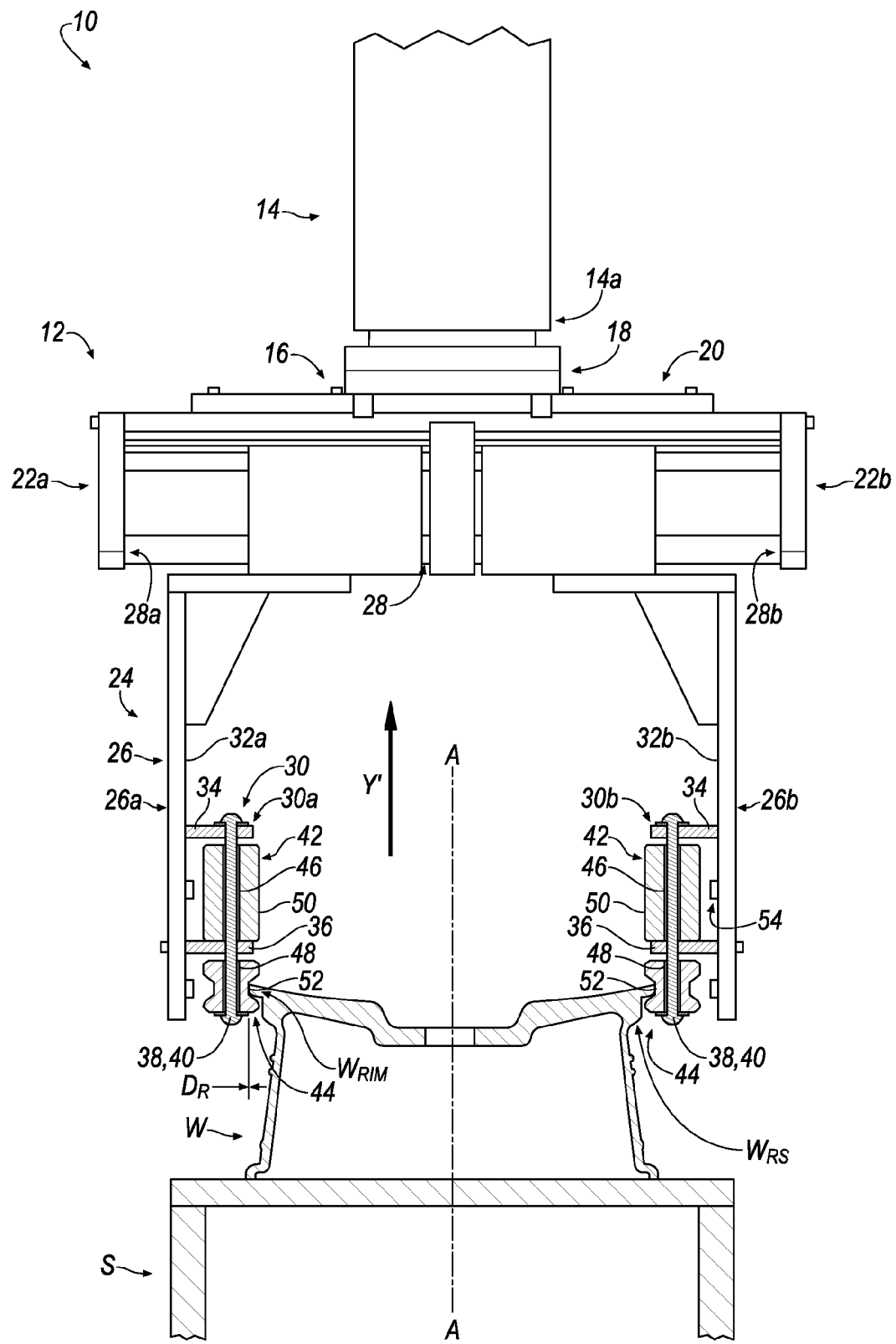
FIG. 2C is another partial cross-sectional view according to FIG. 2B in accordance with an exemplary embodiment of the invention.
Figure 2D:
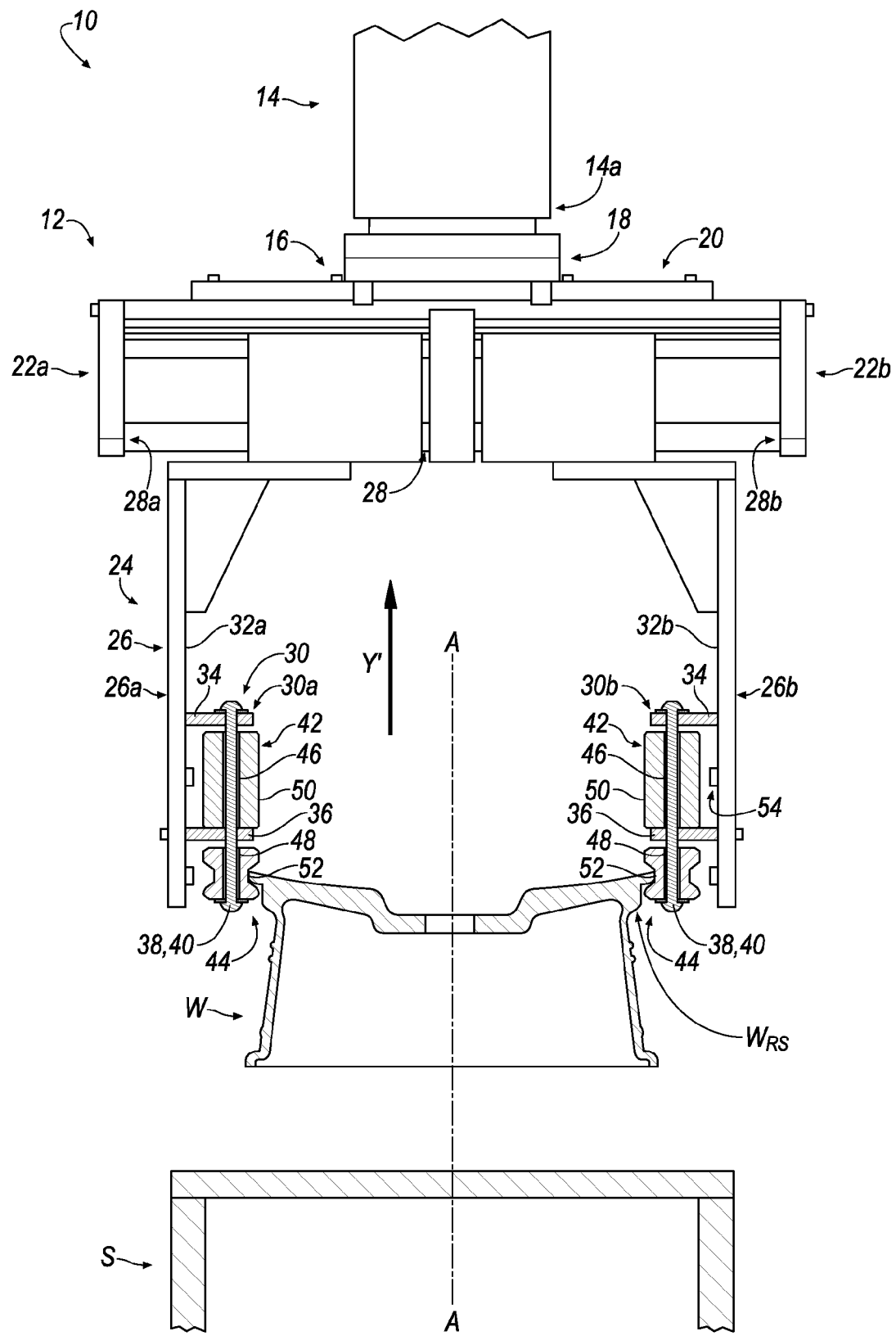
FIG. 2D is another partial cross-sectional view according to FIG. 2C in accordance with an exemplary embodiment of the invention.
Figure 3:
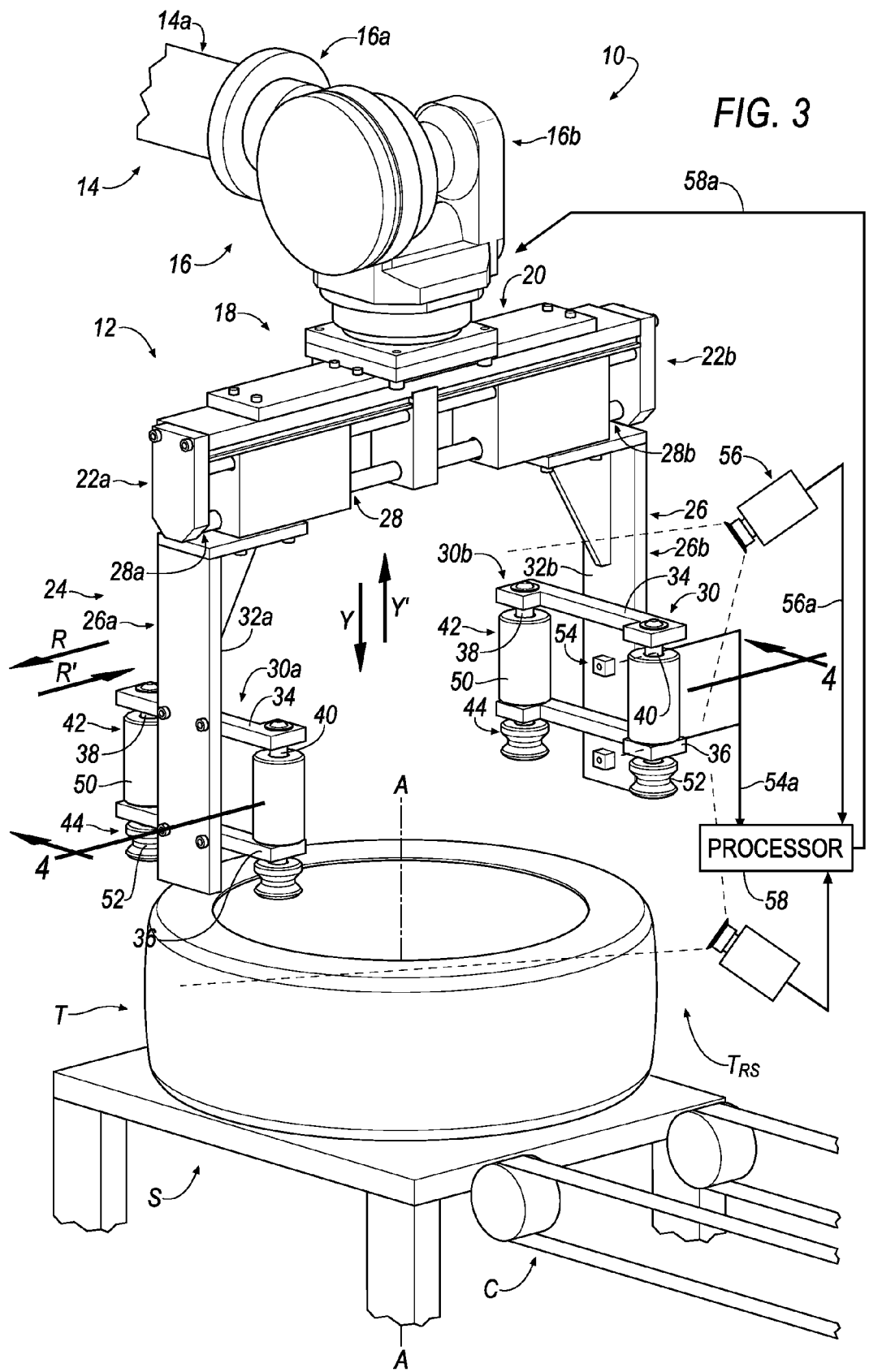
FIG. 3 is an isometric view of an apparatus and a tire in accordance with an exemplary embodiment of the invention.
Figure 4A:
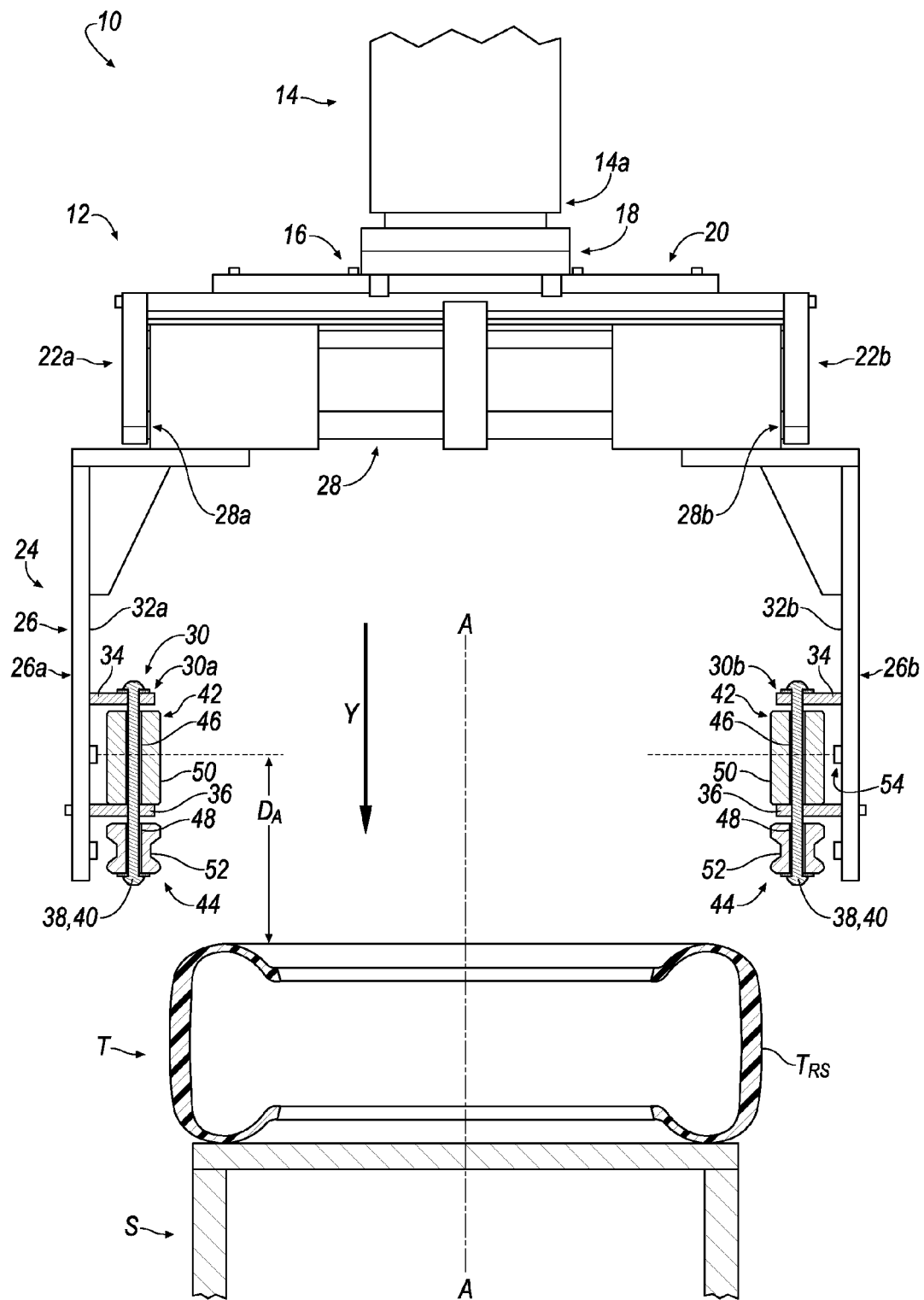
FIG. 4A is a partial cross-sectional view according to line 4-4 of FIG. 3 in accordance with an exemplary embodiment of the invention.
Figure 4B:
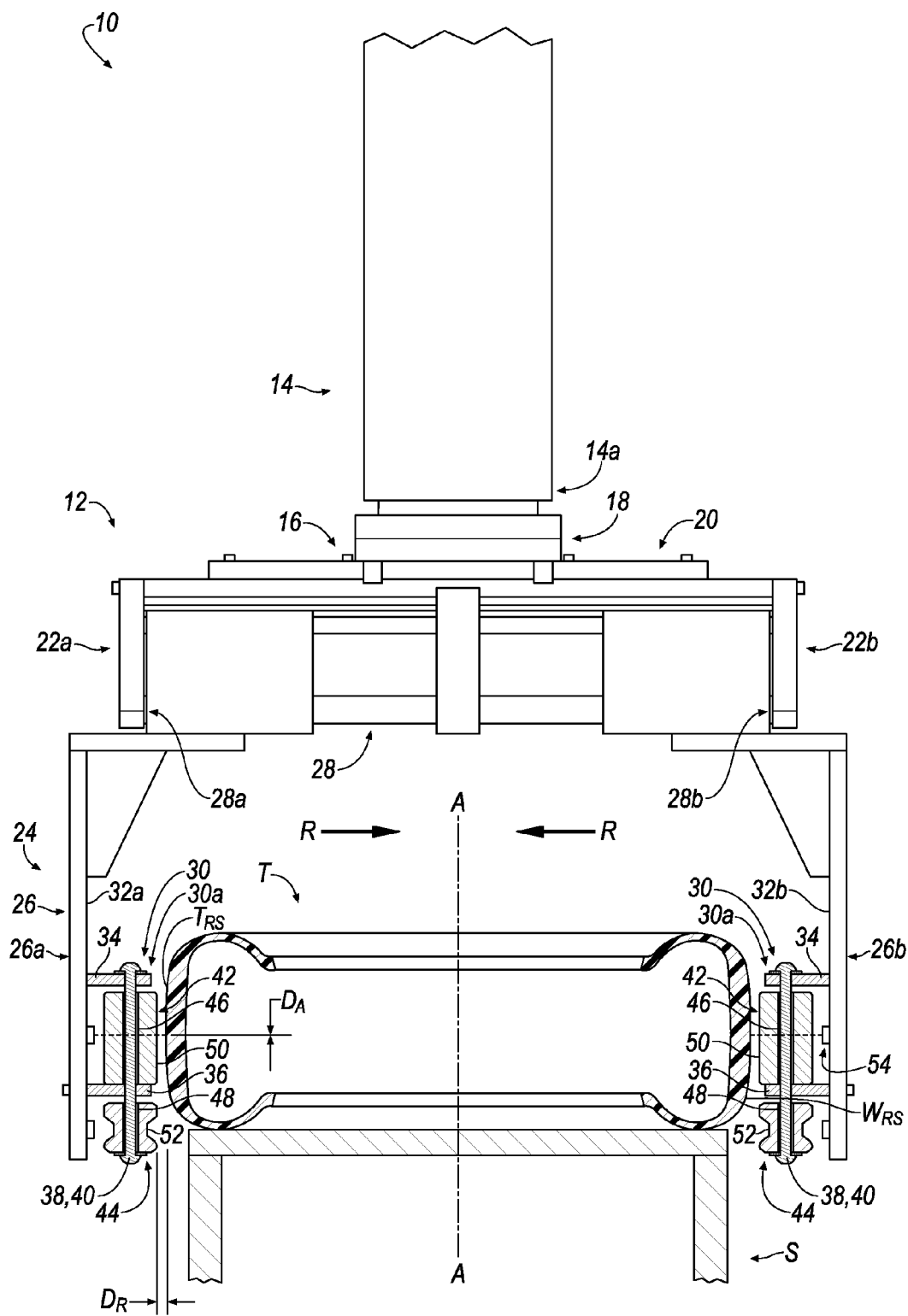
FIG. 4B is another partial cross-sectional view according to FIG. 4A in accordance with an exemplary embodiment of the invention.
Figure 4C:
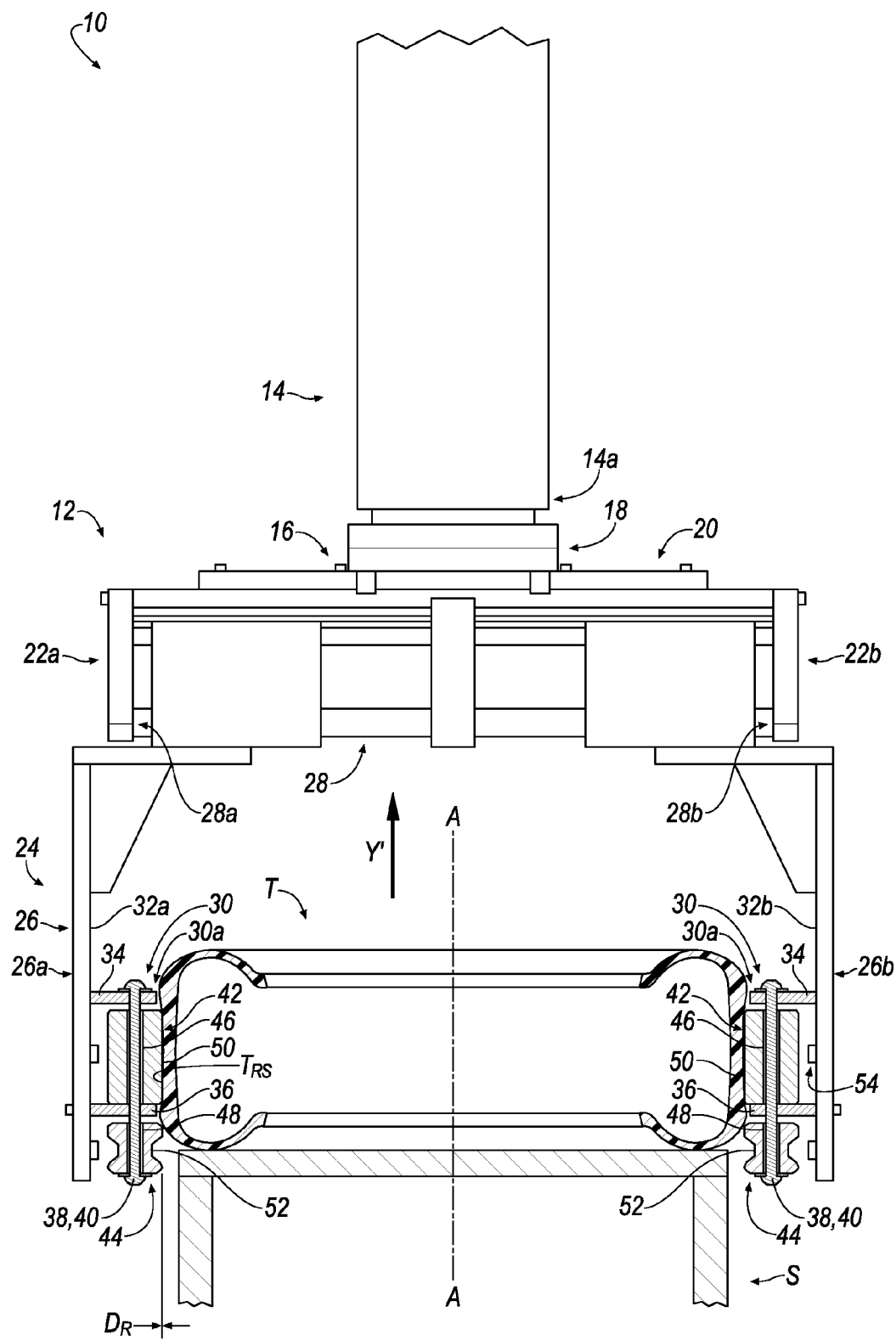
FIG. 4C is another partial cross-sectional view according to FIG. 4B in accordance with an exemplary embodiment of the invention.
Figure 4D:
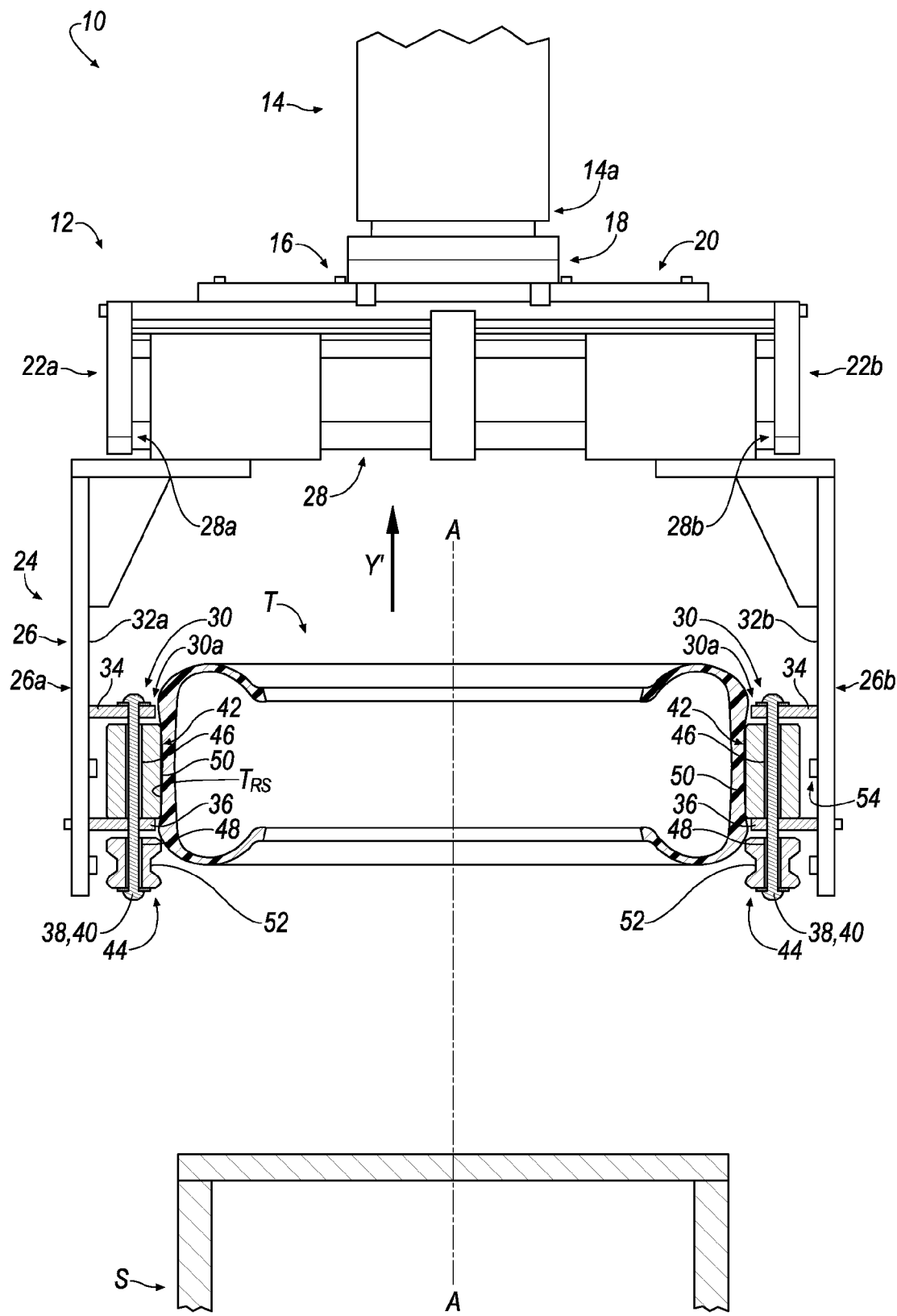
FIG. 4D is another partial cross-sectional view according to FIG. 4C in accordance with an exemplary embodiment of the invention.

In an embodiment, the apparatus 10 includes an assembly 12, which may be referred to as an end effector, having structure that may be selectively modified to perform one of two modes for permitting engagement of the assembly 12 with one of a wheel (see, e.g., FIGS. 1-2D) or a tire (see, e.g., FIGS. 3-4D). In an embodiment, the orientation of the assembly 12 may be selectively manipulated in order to retrieve one of the wheel, W, or the tire, T, in order to process the wheel, W, or the tire, T, for the ultimate manufacturing of a tire-wheel assembly (not shown).

In an embodiment, the "processing" of one of the wheel, W, or the tire, T, may include the step of soaping/lubricating a portion (e.g., a beat seat) of the wheel, W, or a portion (e.g. a bead) of the tire, T, prior to joining one of the wheel, W, or the tire, T, to the other to define a tire-wheel assembly (not shown). In an embodiment, the processing of one of the wheel, W, or the tire, T, may also include the step of gripping the tire, T, with the assembly 12 and utilizing the assembly 12 to move the tire, T, adjacent the wheel, W, for joining the tire, T, to the wheel, W. Although several processing steps are described above, it will be appreciated that the apparatus 10 is not limited to the above-identified processing steps and that the apparatus 10 may be utilized to perform other processing steps, which may ultimately lead to the formation of a tire-wheel assembly.

In an embodiment, the device 10 may include a robotic arm 14 that may be located in a substantially central position relative a plurality of sub-stations of the single-cell workstation. In an embodiment, the robotic arm may include an end 14a connected to a joint 16. In an embodiment, the joint 16 may be connected to the assembly 12.

Figure 1:
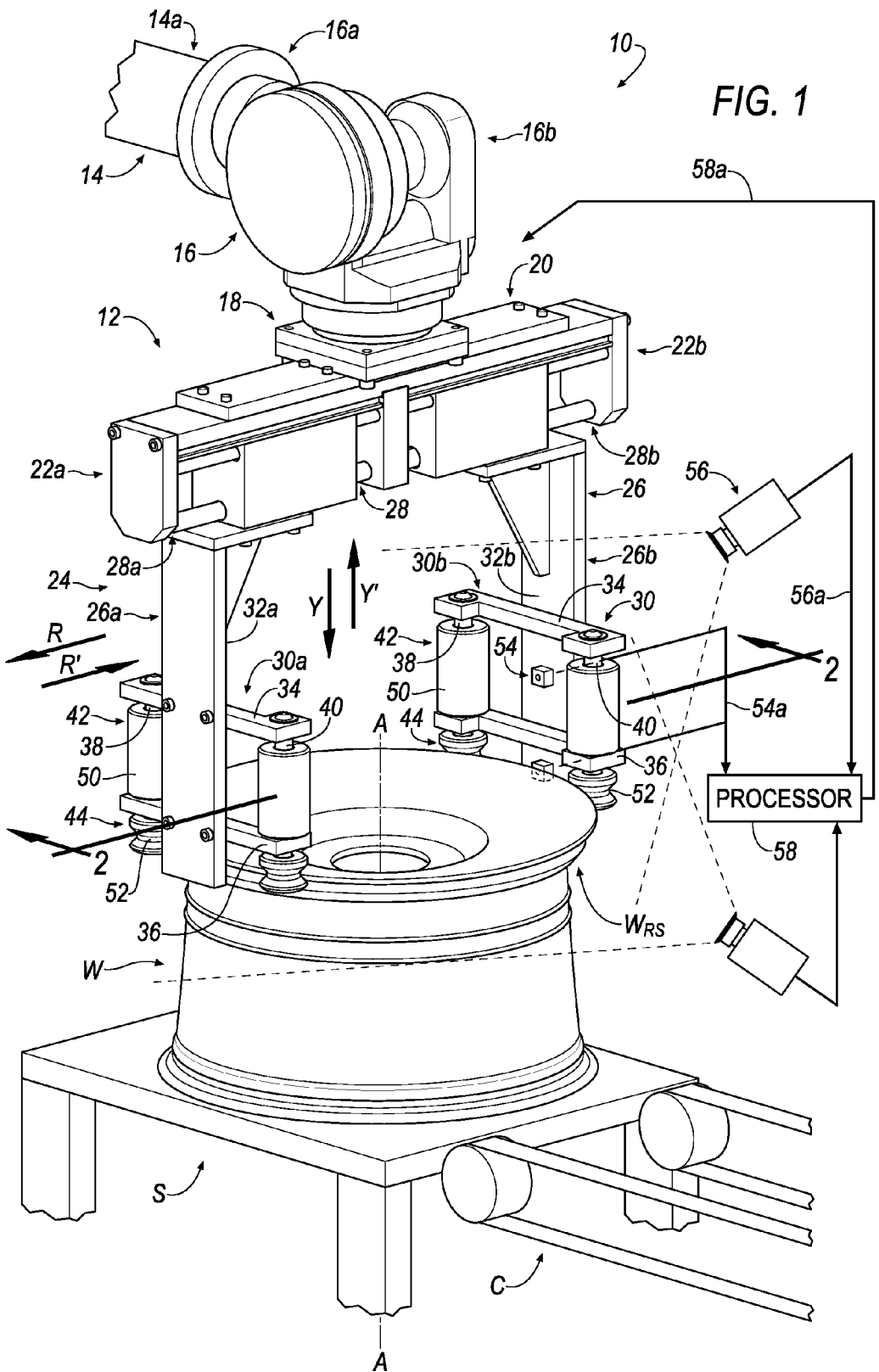
FIG. 1 is an isometric view of an apparatus and a wheel in accordance with an exemplary embodiment of the invention.

In an embodiment, as seen in FIGS. 1 and 3, the joint 16 may include a first joint portion 16a connected to a second joint portion 16b. In an embodiment, the first joint portion 16a may be rotatably-connected to the end 14a of the robotic arm 14. In an embodiment, the second joint portion 16b may be adjustably-connected to the first joint portion 16a such that a pitch/angle of the second joint portion 16b may be adjusted relative the end 14a of the robotic arm.

In an embodiment, the joint 16 may include an interfacing member 18, plate or the like. In an embodiment, as seen in FIGS. 1 and 3, the interfacing member 18 may be attached to the second joint portion 16b. In an embodiment, the interfacing member 18 may be connected to the assembly 12 for coupling the assembly 12 to the joint 16.

In an embodiment, the foregoing description includes reference to axial/radial surfaces, structures and the like. Such descriptions may be relative to an axis, A-A, extending through one or more of the assembly 12, robotic arm 14, joint 16, wheel, W, and/or tire, T.

In an embodiment, the assembly 12 may include a bridge member 20 connected to the interfacing member 18. In an embodiment, the bridge 20 may include a first substantially axial flange 22a and a second substantially axial flange 22b that support a tire/wheel gripping assembly 24.

In an embodiment, the gripping assembly 24 includes a pair of substantially axial members 26 that are movably-supported upon a substantially radial support member 28. In an embodiment a first end 28a of the substantially radial support member 28 may be connected to the first substantially axial flange 22a, and, a second end 28b of the substantially radial support member 28 may be connected to the second substantially axial flange 22b.

In an embodiment, the gripping assembly 24 includes a pair of radially-projecting engaging assemblies 30. In an embodiment, a first radially-projecting engaging assembly 30a of the pair of radially-projecting engaging assemblies 30 is connected to an inner radial surface 32a of a first substantially axial member 26a of the pair of substantially axial members 26, and, a second radially-projecting engaging assembly 30b of the pair of radially-projecting engaging assemblies 30 is connected to an inner radial surface 32b of a second substantially axial member 26b of the pair of substantially axial members 26.

In an embodiment, each radially-projecting engaging assembly 30a, 30b of the pair of radially-projecting engaging assemblies 30 includes at least one first bracket 34, 36 connected to the inner radial surface 32a, 32b of each of the first and second substantially axial members 26a, 26b of the pair of substantially axial members 26. In an embodiment, the at least one first bracket 34, 36 may be arranged substantially perpendicularly with respect to the first and second substantially axial members 26a, 26b of the pair of substantially axial members 26.

In an embodiment, each radially-projecting engaging assembly 30a, 30b of the pair of radially-projecting engaging assemblies 30 includes at least one second bracket 38, 40 connected to the at least one first bracket 34, 36. In an embodiment, the at least one second bracket 38, 40 may be arranged substantially perpendicularly with respect to the at least one first bracket 34, 36.

In an embodiment, at least one engaging member 42, 44 is rotatably-coupled to the at least one second bracket 38, 40. In an embodiment, the at least one engaging member 42, 44 may include a passage 46, 48 (see, e.g. FIGS. 2A-2D, 4A-4D) such that the at least one second bracket 38, 40 may extend through the passage 46, 48 to permit the at least one engaging member 42, 44 to be rotatably-coupled to the at least one second bracket 38, 40.

In an embodiment, the at least one engaging member 42, 44 includes a first engaging member 42 and a second engaging member 44. In an embodiment, the first engaging member 42 includes a substantially cylindrical member having a circumferential outer surface 50. In an embodiment, the second engaging member 44 includes a substantially cylindrical member having a substantially V-shaped, circumferential recess 52.

In an embodiment, the assembly 12 may include at least one sensor 54, 56. In an embodiment, the at least one sensor 54, 56 may include a proximity sensor 54. In an embodiment, the at least one sensor 54, 56, may include an imaging device 56, such as a camera, charge-coupled device (CCD) camera or the like. In an embodiment, the at least one sensor 54, 56 may provide information to a processor 58 in order to permit the processor 58 to determine one or more of the orientation and distance of the apparatus 12 relative a wheel, W, or tire, T.

In an embodiment, the at least one sensor 54, 56 may be connected to the processor 58 (see, e.g., FIGS. 1, 3). In an embodiment, the processor 58 receives signals from the at least one sensor 54, 56 from hardwired/wireless communication line(s) 54a, 56a. In an embodiment, the signal may include information pertaining to a radial distance of the proximity sensor 54 and an outer radial surface of one of the tire, T, and wheel, W. In an embodiment, the signal may include image information from the imaging device 56 that may be utilized by the processor 58 to determine one or more of an axial and radial distance of the apparatus 12 relative one of the tire, T, and wheel, W.

In an embodiment, upon receiving the signal at the processor 58, the processor 58 may send an instruction to one or more of the robotic arm 14, joint 16 and gripping assembly 24 from hardwired/wireless communication line(s) 58a in order to manipulate the orientation of one or more of the robotic arm 14, joint 16 and gripping assembly 24 relative the wheel, W, or tire, T. It will be appreciated that the looped communication systems provided by communication lines(s) 54a, 56a, 58a may change the orientation of one or more of the robotic arm 14, joint 16 and gripping assembly 24 such that the changed movements may ultimately result in selective engagement of the assembly 12 with an outer radial surface, $W_{RS}$, of the wheel, W, or an outer radial surface, $T_{RS}$, of the tire, T, as will be explained in the foregoing disclosure.

In an embodiment, one or more of the robotic arm 14 and joint 16 permits one or more of a radial and axial manipulation of the assembly 12 relative the axis, A-A, in order to locate the assembly 12 proximate the wheel, W, or tire, T. In an embodiment, radial/axial manipulation may occur in response to the instruction signal sent from the processor 58 to one or more of the robotic arm 14 and joint 16.

In an embodiment, as seen in FIGS. 2B-2C and 4B-4C, the first and second substantially axial members 26a, 26b of the pair of substantially axial members 26 of the tire-wheel gripping assembly 24 are movable in one of a radially inward direction upon locating the assembly 12 as described above. In an embodiment, the first and second substantially axial members 26a, 26b of the pair of substantially axial members 26 of the tire-wheel gripping assembly 24 are movable according to the direction of arrow, R, in response to the instruction signals sent from the processor 58 to the tire-wheel gripping assembly 24. Conversely, when it is desired to no longer engage the tire, T, or wheel, W, the first and second substantially axial members 26a, 26b of the pair of substantially axial members 26 of the tire-wheel gripping assembly 24 are movable according to a radially outward direction according to the direction of the arrow, R' (see, e.g., FIGS. 1, 3), which is opposite the direction according to the arrow, R.

Referring to FIGS. 1-2D, a method for utilizing the apparatus 10 in conjunction with a wheel, W, is described according to an embodiment of the invention. Referring first to FIG. 1, an assembly 12 is shown located above a stand, S, that may be located proximate a conveyor, C. In an embodiment, the conveyor, C, may deposit a wheel, W, on to the stand, S.

Referring to FIGS. 2A-2B, the at least one sensor 54, 56 may be utilized in conjunction with the processor 58 for causing one or more of the robotic arm 14 and joint 16 to locate the assembly 12 substantially proximate the wheel, W. In an embodiment, as seen in FIG. 2A, the assembly 12 may be located axially above the wheel, W, at an axial distance, $D_A$. As such, referring to FIG. 2B, one or more of the robotic arm 14 and joint 16 may move the assembly 12 axially toward the wheel, W, according to the direction of arrow, Y, until the axial distance, $D_A$, is approximately equal to zero. Although the above movements may be conducted with the assistance of the at least one sensor 54, 56 in conjunction with the processor 58, it will be appreciated that the invention is not limited to including an automated movement controller/system and that the invention may be practiced in any desirable manner that includes, for example, a joystick, that permits an operator to manually move the assembly 12 axially toward the wheel, W.

Referring to FIGS. 2B-2C, the at least one sensor 54, 56 may be utilized in conjunction with the processor 58 for causing the first and second substantially axial members 26a, 26b of the pair of substantially axial members 26 of the tire-wheel gripping assembly 24 to be moved radially inwardly toward the axis, A-A, according to the direction of arrows, R, such that the substantially V-shaped, circumferential recess 52 of the second engaging member 44 may be moved radially adjacent the outer radial surface, $W_{RS}$, of the wheel, W. In an embodiment, as seen in FIG. 2B, the second engaging member 44 may be located radially spaced away from the outer radial surface, $W_{RS}$, of the wheel, W, at an radial distance, $D_R$. As such, referring to FIG. 2C, the first and second substantially axial members 26a, 26b of the pair of substantially axial members 26 may be moved radially toward the wheel, W, according to the direction of the arrow, R, until the radial distance, $D_R$, is approximately equal to zero such that the substantially V-shaped, circumferential recess 52 of the second engaging member 44 may be moved radially adjacent the outer radial surface, $W_{RS}$, of the wheel, W. Although the above movements may be conducted with the assistance of the at least one sensor 54, 56 in conjunction with the processor 58, it will be appreciated that the invention is not limited to including an automated movement controller/system and that the invention may be practiced in any desirable manner that includes, for example, a joystick, that permits an operator to manually move the first and second substantially axial members 26a, 26b of the pair of substantially axial members 26 radially toward the outer radial surface, $W_{RS}$, of the wheel, W.

Referring to FIG. 2C, in an embodiment, the substantially V-shaped, circumferential recess 52 of the second engaging member 44 engages a portion of the outer surface, $W_{RS}$, of the wheel, W. In an embodiment, the portion of the outer surface, $W_{RS}$, of the wheel, W, includes a rim, $W_{RIM}$, of the wheel, W.

In an embodiment, as seen in FIG. 2B, the substantially V-shaped, circumferential recess 52 of the second engaging member 44 includes a radial engaging surface portion 60 and an axial engaging surface portion 62. In an embodiment, the radial engaging surface portion 60 may engage a radial outer surface portion, $W_{RIM-OR}$, of the wheel, W. In an embodiment, the axial engaging surface portion 62 may engage an inner axial surface portion, $W_{RIM-IA}$, of the wheel, W. Accordingly, the engagement of one or more of the radial engaging surface portion 60 and the axial engaging surface portion 62 with the radial outer surface portion, $W_{RIM-OR}$, and the inner axial surface portion, $W_{RIM-IA}$, may permit the tire-wheel gripping assembly 24 to engage the wheel, W, as seen in FIGS. 2C-2D, for subsequent movement of the wheel, W, away from the stand, S.

Referring to FIG. 2D, the wheel, W, is shown moved away from the stand, S. In an embodiment, movement of the tire-wheel gripping assembly 24 according to the direction of the arrow, Y', may be in response to movement of one or more of the robotic arm 14 and joint 16. In an embodiment, movement of one or more of the robotic arm 14 and joint 16 that causes movement of the wheel, W, away from the stand, S, may be in response to utilization of the at least one sensor 54, 56 in conjunction with the processor 58. It will be appreciated, however, that the invention is not limited to including an automated movement controller/system that causes movement of the wheel, W, away from the stand, S, and that the invention may be practiced in any desirable manner that includes, for example, a joystick, that permits an operator to manually move the wheel, W, away from the stand, S.

Referring to FIGS. 3-4D, a method for utilizing the apparatus 10 in conjunction with a tire, T, is described according to an embodiment of the invention. In an embodiment, the method for utilizing the apparatus 10 in conjunction with a tire, T, is substantially similar to that as described above in FIGS. 1-2D with respect to the apparatus 10 and the wheel, W. However, as seen in FIG. 4C, the circumferential outer surface 50 of the first engaging member 42 engages a radial outer surface portion, $T_{RS}$, of the tire, T, in order to permit the tire-wheel gripping assembly 24 to move the tire, T, away from the stand, S, according to the direction of the arrow, Y'.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A dual mode end effector, comprising: a bridge member having a first end and a second end; a tire/wheel gripping assembly connected to the bridge member, wherein the tire/wheel gripping assembly includes: a first substantially axial flange extending from the first end of the bridge member, a second substantially axial flange extending from the second end of the bridge member, at least one tire-engaging member rotatably-coupled to each of the first substantially axial flange and the second substantially axial flange, wherein the at least one tire-engaging member selectively-engages an outer surface of a tire when the tire/wheel gripping assembly is arranged proximate the tire, and at least one wheel-engaging member rotatably-coupled to each of the first substantially axial flange and the second substantially axial flange, wherein the at least one wheel-engaging member selectively-engages an outer surface of a wheel when the tire/wheel gripping assembly is arranged proximate the wheel; a pair of substantially axial members, a substantially radial support member, and a pair of radially-projecting engaging assemblies, wherein the pair of substantially axial members are movably-supported upon the substantially radial support member, wherein a first end of the substantially radial support member is connected to the first substantially axial flange, wherein a second end of the substantially radial support member is connected to the second substantially axial flange, wherein a first radially-projecting engaging assembly of the pair of radially-projecting engaging assemblies is connected to an inner radial surface of a first substantially axial member of the pair of substantially axial members, wherein a second radially-projecting engaging assembly of the pair of radially-projecting engaging assemblies is connected to an inner radial surface of a second substantially axial member of the pair of substantially axial members, wherein each of the first and second radially-projecting engaging assembly of the pair of radially-projecting engaging assemblies includes at least one first bracket connected to the inner radial surface of each of the first and second substantially axial members of the pair of substantially axial members, wherein each of the first and second radially-projecting engaging assembly of the pair of radially-projecting engaging assemblies includes at least one second bracket connected to the at least one first bracket, wherein the at least one second bracket is arranged substantially perpendicularly with respect to the at least one first bracket, wherein both of the at least one tire-engaging member and the at least one wheel-engaging member are rotatably-coupled to the at least one second bracket, wherein the at least one second bracket extends through a passage formed in each of the at least one tire-engaging member and the at least one wheel-engaging member; at least one sensor that provides means for approximating a distance between an outer surface of a tire or a wheel and a portion of the tire/wheel gripping assembly that is utilized for engaging the outer surface of the tire or the wheel; a processor connected to the at least one sensor, wherein the processor receives one or more signals from the at least one sensor, wherein the processor utilizes the one or more signals to determine one or more of an axial distance and a radial distance between the outer surface of the tire or the wheel and the portion of the tire/wheel gripping assembly that is utilized for engaging the outer surface of the tire or the wheel; a robotic arm connected to a joint, wherein the joint is connected to the bridge member, wherein, upon determining one or more of the axial distance and the radial distance, the processor provides means for controllably-manipulating a spatial orientation of one or more of the robotic arm, joint and gripping assembly relative the wheel or tire for selectively-engaging the wheel or the tire, wherein the at least one wheel-engaging member includes a substantially V-shaped, circumferential recess that provides means for engaging a portion of the outer surface of the wheel, wherein the portion of the outer surface of the wheel includes a rim of the wheel.

2. The dual mode end effector according to claim 1, wherein the substantially V-shaped, circumferential recess includes a radial engaging surface portion and an axial engaging surface portion, wherein the radial engaging surface portion provides
    means for engaging a radial outer surface portion of the wheel, wherein the axial engaging surface portion provides
    means for engaging an inner axial surface portion of the wheel.

\* \* \* \* \*